Nov. 9, 1971  C. D. PHIPPS  3,618,428

AUTOMOBILE RADIATOR CAP TOOL

Filed June 29, 1970  2 Sheets-Sheet 1

INVENTOR.
CHARLES DENNIS PHIPPS

BY *John Cyril Malloy*

ATTORNEY.

Nov. 9, 1971  C. D. PHIPPS  3,618,428
AUTOMOBILE RADIATOR CAP TOOL
Filed June 29, 1970  2 Sheets-Sheet 2
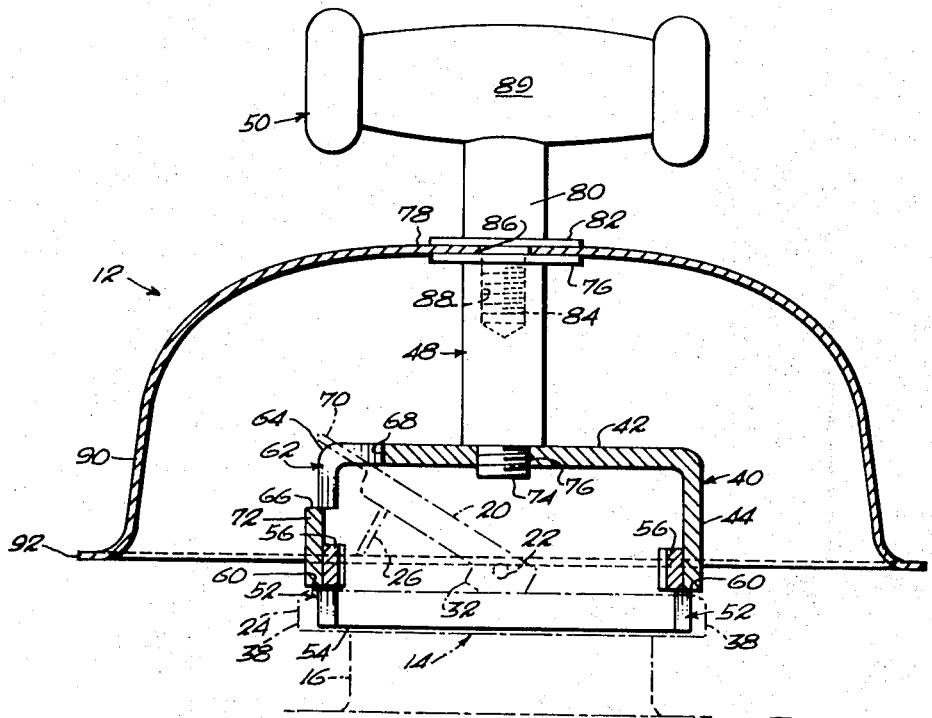
Fig. 2
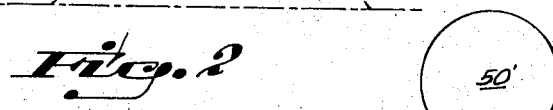
Fig. 3
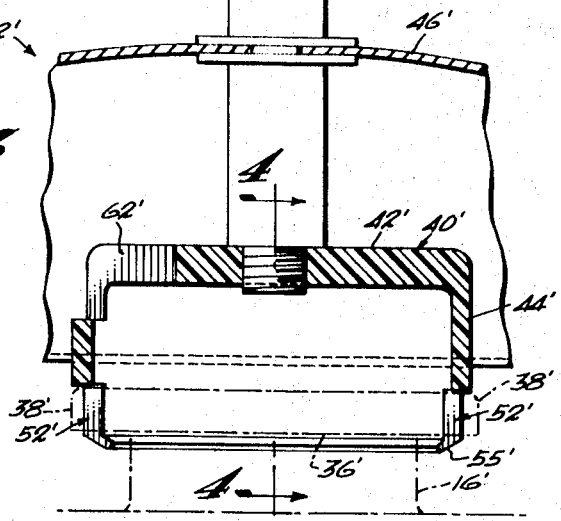
Fig. 4
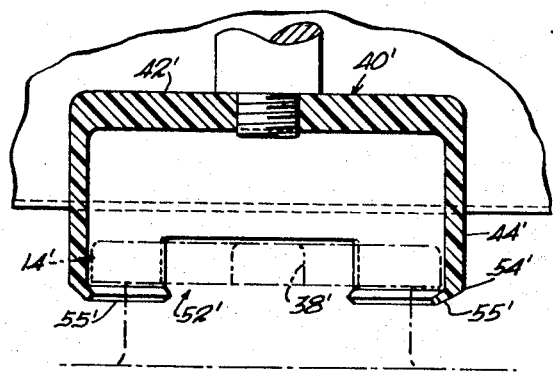
INVENTOR.
CHARLES DENNIS PHIPPS
BY John Cyril Malloy
ATTORNEY.

United States Patent Office 3,618,428
Patented Nov. 9, 1971

3,618,428
AUTOMOBILE RADIATOR CAP TOOL
Charles Dennis Phipps, 5990 SW. 111th St.,
Miami, Fla. 33143
Filed June 29, 1970, Ser. No. 50,830
Int. Cl. B25b 29/00; B67b 7/44
U.S. Cl. 81—3.1 R          7 Claims

ABSTRACT OF THE DISCLOSURE

This disclosure concerns a small hand tool adapted for use in removing an automobile radiator cap and particularly for use in removing a cap from the radiator of an overheated automobile engine safely and without hazard of injury to the user by boiling hot fluids from the engine cooling system. The tool is provided with socket structure adapted to fit over the radiator cap and permit removal thereof, it includes a deep bowl-like shield having a rim portion flared downwardly over the socket structure for deflecting hot liquids from a radiator away from the user, and includes a T-shaped handle for manipulation of the tool.

BACKGROUND OF THE INVENTION

Field of the invention

This invention relates to automotive vehicle service tools generally and particularly relates to small hand tools operative in removing an automobile radiator cap.

Description of the prior art

With the advent of automobile engines having pressurized cooling systems, a problem of considerable import has arisen which concerns safety in removing a radiator cap of an over-heated engine. Not infrequently, an automobile operator or individual is burned by hot water escaping from the radiator of an overheated engine and this is particularly a significant problem with regard to service station or garage operation. As is well known, an engine operates more efficiently when its cooling system is slightly pressurized and the coolant water medium is maintained under a few pounds of pressure. Pressurizing the cooling system of an automobile reduces evaporation of the coolant liquid and also permits operating the engine at a slightly higher and more efficient temperature as contrasted with an engine having a non-pressurized cooling system. Many times an automobile engine will not appear to be overly hot and when in fact it is approximately at the boiling point, and when the cap is removed, the water spontaneously boils, gushing from the radiator and in many instances injuring the operator or service station attendant. To eliminate such occurrences, certain radiator caps are provided with pressure relief valves whereby a user may first release the pressure in the cooling system before unscrewing and removing the radiator cap. Also, certain caps are provided with a dual function safety lock-pressure release lever. When the lever is in a down position against the top of the cap, a dog portion of the lever engages the filler neck of the radiator and prevents removal of the cap until the lever is raised. As the lever is moved to a raised position, in addition to lifting the lock dog and permitting turning movement of the cap, the lifting of the lever unseats a diaphragm seal of the cap and releases the pressure of the cooling system.

Various tools have heretofore been designed for safely removing a radiator cap from a hot automobile engine cooling system. Pats. No. 3,186,263; 3,121,355 and 3,007,357 each discloses a tool adapted for use in removing radiator caps. Each of the prior art tools may operate effectively in removing a standard automobile radiator cap, the typical prior art radiator cap tool, however, may not be used for removing a cap having a pressure release-lock lever. It is often desirable to quickly remove the radiator cap of an overheated automobile engine in order to add water to the radiator and to prevent damage to the engine; in such instances, it may not be desirable to wait until the pressure of the cooling system leaks down through the radiator cap relief valve. Since the typical prior art radiator cap tool may not engage and remove a lever type cap, an automobile equipped with such cap may be damaged from overheating because the cap may not be quickly removed and water added to the cooling system of the engine.

SUMMARY OF THE INVENTION

The radiator cap removal tool of the instant invention obviates many of the above-mentioned objectionable features and provides a tool which as an important feature may optionally be used for removing a standard automobile cap or a cap having a pressure release-lock lever. The tool of the instant invention may be used for quickly removing a lever type radiator type cap from an overheated engine, permitting a service station attendant to quickly add water to the engine cooling system, preventing damage to the engine. A service station attendant or automobile operator may safely remove a radiator cap without using sticks, rags or the like which is hazardous and may result in injury from the hot boiling liquid of the cooling system. The radiator cap tool of the instant invention is particularly useful in garages, service stations or the like, and may also be useful in automobile maintenance and repair services in the transportation department of public utilities, military services, or the like. The tool is easy to use, it is of substantially simple sturdy design, it may be economically manufactured and attractively marketed.

BRIEF DESCRIPTION OF THE DRAWING

FIG. 2 is a sectional view of the tool of FIG. 1;

FIG. 3 is a fragmentary sectional view of another embodiment of the tool; and

FIG. 4 is a sectional view taken as one the line 4—4 of FIG. 3.

DESCRIPTION OF THE PREFERRED EMBODIMENTS

Figure 1:
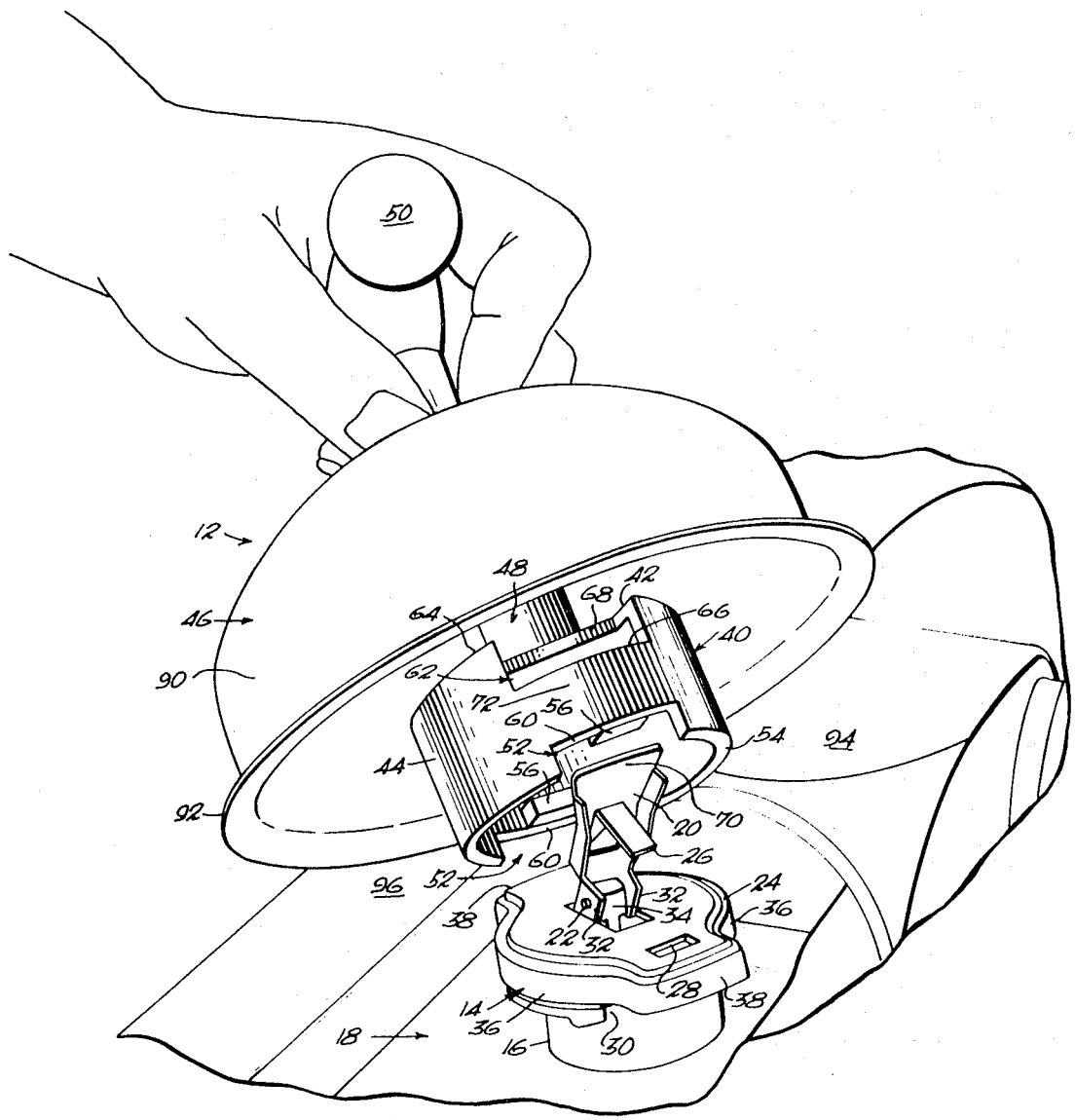
FIG. 1 is an environmental perspective view of a preferred embodiment of the radiator cap removal tool of the instant invention.

A preferred embodiment of the invention (FIGS. 1 and 2) is indicated by the numeral 12 and is shown and described in operative relation with a lever type cap 14 detachably secured to the filler neck 16 of an automobile radiator 18. The radiator cap 14 is of typical configuration and includes a pressure release-lock lever 20 pivotally supported by pin means 22, centrally superjacently of the cap body 24; the lever 20 is adapted to be pivotally manipulated between a raised released disposition (see FIG. 1) and a lowered operative disposition superposed horizontally on the radiator cap body. When in a lowered operative disposition, a lock dog portion 26 projects downwardly through an aperture 28 in the cap body; the bottom distal edge of the dog portion 26 extends downwardly in a lock slot 30 of the radiator filler neck 16 and prevents turning movement and displacement of the cap 14 from the filler neck of the radiator. When the lever 20 is moved to a raised disposition, the dog portion 26 is lifted from the aperture 28, removing the dog portion from the lock slot 30 of the filler neck, permitting turning movement of the radiator cap and displacement thereof from the radiator. Concurrently, as the lever 20 is raised, the cam portions 32, 32 thereof ridingly engage the cap body 24 and lift the diaphragm seal shaft 34, thereby lifting the diaphragm seal (not shown) from its seat in the radiator filler neck 16, reelasing the pressurized fluid in the cooling system to the atmosphere. The radiator cap 14 typically includes a downturned peripheral flange portion 36, 36 and finger lug portions 38, 38 protruding oppositely of the filler cap body.

The radiator cap tool 12 includes a socket member 40 adapted to nest over the radiator cap, including a top wall portion 42 and circumferential skirt portion 44; a bowl-shaped shield member 46 of inverted form; a connect member 48 coaxially connecting the socket and shield members 40 and 46 in rigidified unitary relation; and a T-shaped handle member 50 fixed superjacently on the shield member 46, providing hand grip means for manipulation of the tool.

The skirt portion 44 of the socket member 40 preferably is of interspacial proportion slightly larger than the peripheral flange portion 36 of the radiator cap body 24 and permits loose nesting engagement of the socket member 40 concentrically on the radiator cap as shown in FIG. 2. The skirt portion 44 of the socket member is provided with a diametrically spaced pair of lug slots 52, 52 intersecting the lower edge margin 54 of the skrit. The lug slots 52, 52 each are of longitudinal interspacial extension permitting the slot structure to loosely fit over respectively a lug protrusion 38, 38 of the radiator cap. Permanent type magnet elements 56, 56 preferably are fixedly supported in diametrically spaced arrangement on the interior circular surface 58 of the socket skirt 44, providing magnetic force means for removably holding the radiator cap 14 nested in the socket structure. The magnet elements 56, 56 preferably are arranged directly superjacently of the lug slot roof surfaces 60, 60 and in diametrically spaced disposition engaging the cap body 24 adjacent the lug protrusions 38, 38.

The socket member 40 is provided with a lever relief slot 62 preferably formed in the circular rim portion 64 of the socket member and directly over a selected one of the lug slots 52, 52. As is shown in FIG. 2, the lever relief slot 62 is defined in part by opposing horizontal edge structure 66, 68 defined respectively in the skirt and top wall portions 44, 42 of the socket member. When the tool is in operative configuration, engaged with the radiator cap 14, the distal extension 70 of the lever 20 is received in the slot 62. The over-center operation of the cam portions 32, 32 of the cam locking lever 20, and the resilient axial force on the diaphragm shaft 34, urges the lever upwardly contiguous to the slot structrue 68 of the socket wall 42 to a position as shown in FIG. 2. In the design of certain radiator caps, however, the over-center action of the lock lever may be such as to cause the lever to be urged downwardly and against the slot surface 66 of the skirt structure 44 of the socket member. That portion designated 72 of the skirt 44 may thus define a lever lift portion operative in maintaining the lever in a lifted position for removal of the cap.

The spacer member 48 preferably is of thick rod form, having a lower end provided with external thread means 74 engaging a threaded aperture 76 formed centrally in the top wall 42 of the socket member. The spacer member, arranged in the hollow interior of the shield member 46, preferably is provided with an external annular flange portion 76 engaging the interior undersurface of the shield member. The shank portion 80 of the T-handle 50 is preferably provided with an annular flange 82 and a threaded projection 84. The T-handle 50 clampingly secures the central portion 78 of the shield member 46 between the flange elements 76, 82 by screw thread engagement with the spacer member 48. The threaded projection 84 of the handle shank 80 passes through a central aperture 86 in the shield member; the threaded projection 84 of the handle shank 80 engages a threaded socket opening 88 formed in the spaced 48 and joins the structure of the shield member, spacer member, and T-handle in unitary rigidified relation. The hand grip portion 89 of the handle 50 preferably is disposed in horizontal extension corresponding with the horizontal diametric spacing of the slots 52, 52 in the socket structure 40. This permits a user to properly orientate the tool as it is placed over the cap in use.

The broad circular flange portion 90 of the shield member 46 preferably terminates in a circular flared rim 92 lying coincident to a plane intersecting the socket member 40 medially of its axial extension. The rim portion 92 of the shield 46 preferably is arranged at a level relative to the socket member 40 permitting proper shielding of a user from escaping steam or hot water from the radiator; however, the rim 90 is not disposed so low as to scrape against or intersect the upper margin surfaces of the radiator header tank 94 or radiator yoke structure 96 during use of the tool. In a preferred embodiment of the invention, a plurality of spacer members 48, of different lengths are provided and a selected one may be used for affording proper clearance of the shield rim 92 above the radiator tank 94 or yoke structure 96. The shield, spacer and handle means may be threadedly disassembled and reassembled utilizing a spacer member of a selected length, providing a desired elevation of the shield rim 92 above the lower edge margin 54 of the socket member, thereby providing a desired clearance of the rim above the radiator tank and yoke structure 94 and 96 of a particular automobile.

In using the tool 12, the following simple procedure may be carried out: The user lifts the lever 20 of the radiator cap 14 thereby unlocking the cap for turning movement and permitting escape of pressurized air or steam from the cooling system; the user may then lift the tool 12 by the hand grip portion of the handle 50 and place the tool over the radiator cap with the slot structure 52, 52 of the socket portion 50 restingly engaging the lug projections 38, 38 of the cap and with the lever distal portion 70 projecting through the lever relief slot 62 of the socket portion; the user then turns the tool one-quarter turn counterclockwise, releasing the cap in the filler neck 16 of the radiator, and permitting the cap to be lifted from the radiator; the magnetic force of elements 56, 56 acting on the cap body 24 holds the cap in the socket member 40 and permits a hot radiator cap to be lifted from the filler neck of the radiator by lifting the tool 12; a hot radiator cap may be left to cool in the socket portion 40 of the tool and then removed and replaced on the radiator after servicing the cooling system of the automobile.

The alternate embodiment of the invention (FIGS. 3 and 4) is indicated by reference character 12′ and differs in structure from the embodiment 12 only in the configuration of the socket member 40′ and particularly the means for releasably maintaining a removed or displaced radiator cap in the socket member: the tool 12′ includes a shield member 46′, a spacer member 48′ and T-handle means 50′, each being of form and function corresponding with the above-described embodiment. The socket member 40′ of the tool embodiment 12′ preferably is formed of plastic material of firm slightly elastic character; in particular, the skirt portion 44′ is formed of a material having property permitting the tool 12′ to be pressed downwardly over a cap 14′, expanding the skirt and providing friction means for lifting and holding a cap displaced from the radiator filler neck 16′. The lower edge margin 54′ of the skirt portion 44′ preferably is provided with internal bead portions 55′, 55′ adapted to expand over and constrict underneath the radiator cap flange portion 36′ when the tool is pressed downwardly over a radiator cap and the cap received in the socket member. The bead portions 55′, 55′ provide detent means for removably holding a cap in the socket structure of the tool. A radiator cap may be removed from the socket of the tool by grasping the underside diaphragm seal part of the cap, by pulling the cap outwardly and extracting it from the resilient socket structure.

The radiator cap 14' (FIGS. 3 and 4) represents a standard cap having lug portions 38', 38' providing a free fit in the lug slots 52', 52' of the tool 12'. In using the tool to remove a standard type radiator cap 14', the lever relief slot 62' of the socket structure 40' will not be used. It is of course apparent, that the tool 12' may be utilized for removing a lever type cap 14 and in such use, the distal portion 70 of the lever will project through the lever relief opening 62' of the socket structure. A lever type cap 14 may be removed from the resilient skirt 44' of the tool 12' by simply grasping the cap on the underside seal part and pulling it outwardly away from the skirt structure.

While the instant invention is shown and described in preferred embodiments, it will be understood that various changes and modifications may be made in the disclosed structure without departing from the spirit and scope of the invention.

What is claimed is:

1. A hand tool operative particularly for removing an automobile radiator cap of the type having oppositely protruding finger lugs and a safety lock-pressure release lever on the top of the cap, the tool comprising socket means adapted to removably fit over the radiator cap including skirt means concentrically arranged relative to the axis of said socket means and having structure defining slot openings respectively simultaneously receiving the lock-pressure release lever and the finger lug portions of the radiator cap, a bowl-shaped shield member, means connecting in rigidified unitary relation the socket means and shield means with said socket means being arranged in the hollow interior of said shield means in concentric relation and including handle means fixed to the exterior of said shield means for manipulation of the tool.

2. A hand tool as set forth in claim 1 wherein said socket means is in the form of a socket member of inverted cup form including wall structure defining oppositely arranged diametrically spaced lug slot openings intersecting the lower edge margin of said skirt means, operative for receiving the finger lug protrusions of the radiator cap, and structure defining a relief opening disposed directly superjacently of at least one of the lug slot openings and adapted to receive the distal extension of the safety lock-pressure release lever during manipulation of the radiator cap.

3. A tool as set forth in claim 2 wherein said connecting means includes a spacer member concentrically arranged on the axis of the tool, rigidly interposed between the shield member and socket member.

4. A tool as set forth in claim 1 which additionally includes permanent type magnet means supported on said skirt means adapted to releasably hold a displaced radiator cap in said socket means of the tool.

5. A tool as set forth in claim 1 wherein said skirt means of said socket means is formed of plastic material of firm elastic character and configured of interspacial proportion permitting resilient constriction of a radiator cap and frictional release-holding of a displaced radiator cap in said socket means of the tool.

6. A tool as set forth in claim 5 wherein said skirt means includes internal bead means formed on the lower edge margin of said skirt means, of elastic character, and configured slightly smaller in interspacial extension than the external periphery of the radiator cap, said bead means being adapted to expand over and constrict underneath the radiator cap periphery for releasably holding a displaced radiator cap in the socket means of the tool.

7. A tool as set forth in claim 1 wherein said handle means is of letter T formation including a horizontal hand grip portion and a vertical shank portion aligned coincident to the tool axis and connecting in rigidified relation said hand grip portion and shield means.

References Cited
UNITED STATES PATENTS

| | | | |
|---|---|---|---|
| 3,048,067 | 8/1962 | Miles et al. | 81—90(5) X |
| 3,481,227 | 12/1969 | Shook | 81—3.1 |
| 3,121,355 | 2/1964 | Morel et al. | 81—90(3) |

THERON E. CONDON, Primary Examiner

R. V. PARKER, JR., Assistant Examiner

U.S. Cl. X.R.

81—125